Dec. 7, 1954　　　　J. H. JOHNSON　　　　2,696,232
ADJUSTABLE PLURAL JOINT MITER CLAMP
Filed Feb. 5, 1951
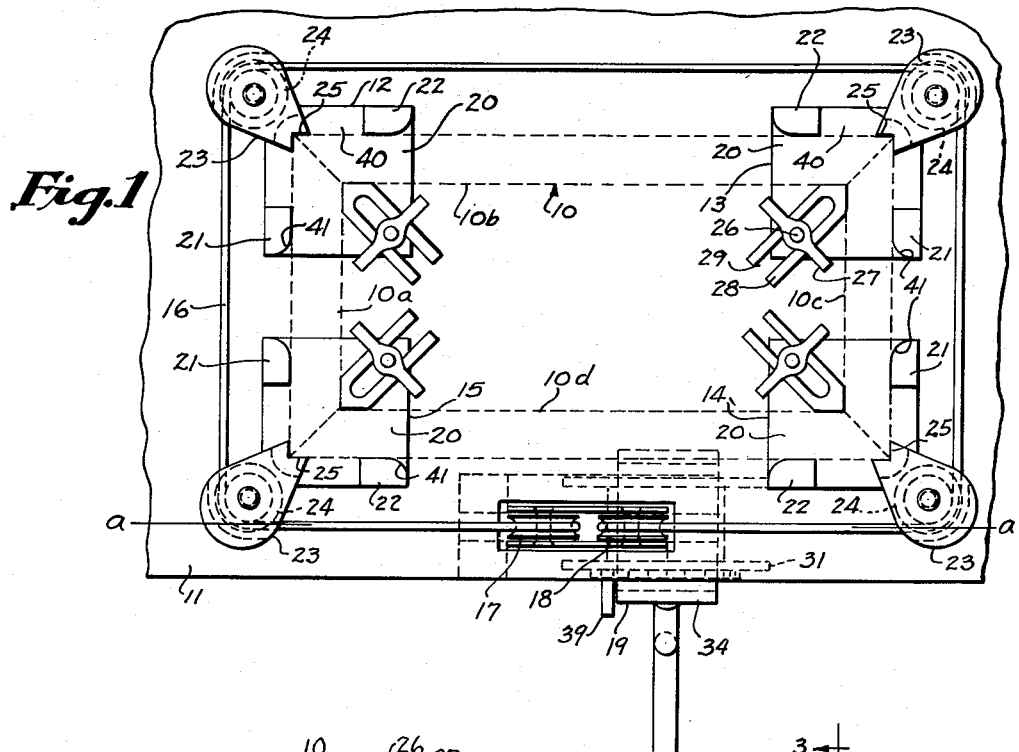
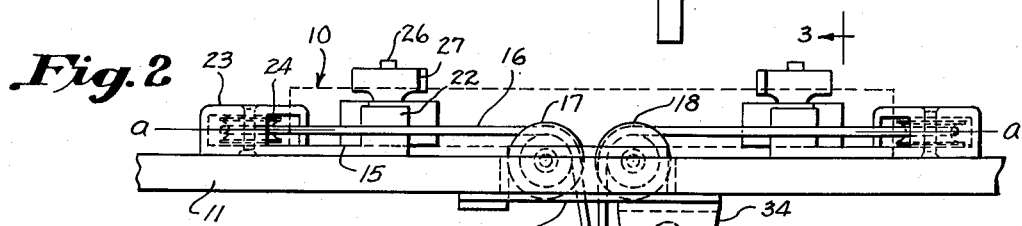
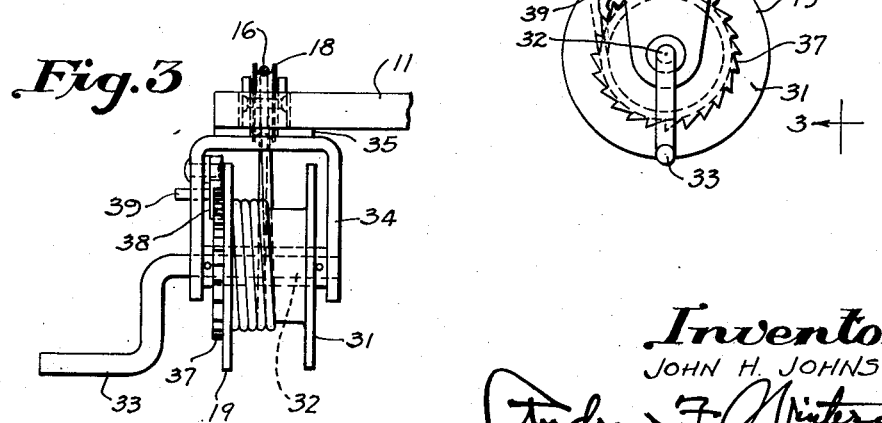
Inventor
JOHN H. JOHNSON
Atty United States Patent Office 2,696,232
Patented Dec. 7, 1954

2,696,232

ADJUSTABLE PLURAL JOINT MITER CLAMP

John H. Johnson, Rockford, Ill., assignor to Andrew F. Wintercorn, Rockford, Ill.

Application February 5, 1951, Serial No. 209,477

1 Claim. (Cl. 144—292)

This invention relates to adjustable woodwork holding clamps, adapted, for example, for clamping together the parts of a picture frame or any article of cabinet work during the gluing and nailing or screwing thereof; and it has for its primary object to expedite such operations and thus reduce labor costs while at the same time enabling improving the calibre of work done.

Another object is to provide a woodwork holding clamp which, while in use, permits the work to be freely turned, while held in the clamp, whereby to facilitate nailing or screwing of the corners.

The novel features of my invention will be pointed out in the following detailed description, with reference to the accompanying drawing, wherein:

Fig. 1 is a plan view showing the improved clamping device or fixture in operation;

Fig. 2 is a frontal elevation; and

Fig. 3 is a view of the windlass taken at line 3—3 of Fig. 2.

The same reference numerals are applied to corresponding parts in these three views.

In Fig. 1 a picture frame 10 in process of assembly is indicated in dotted outline and comprises the four members 10a to 10d inclusive. This, however, is an illustration of only one of many uses to which the device may be put.

The clamping device or fixture, per se, comprises a base plate 11, shown fragmentarily, which may conveniently be a rigid board; four corner blocks 12–15 inclusive; a wire cable 16; a pair of pulleys 17 and 18; and a windlass 19.

The four corner blocks 12–15 rest upon but are not attached to the base plate, and each comprises a square base portion 20 and two upright lugs 21 and 22 which serve as lateral supports for the adjacent frame members. Each corner block further includes a pulley housing 23 serving as a support for a pulley 24; and each is square notched as at 25 to form a nest for reception of one outside corner of the frame. Preferably, each block is additionally provided with an upright stud 26 threaded to receive a wing nut 27 which serves to secure to the block an interior clamping member 28 having a longitudinal slot 29 and shaped at one end, as shown, to conform to the adjacent interior corner of the frame—thus cooperating with the square notch 25 to clamp the contiguous frame members together in precise perpendicular relation. As will be apparent, the slot 29 enables the member 28 to be adjusted to suit pieces of various widths.

The wire rope or cable 16 embraces all four pulleys 24 and passes over the pulleys 17 and 18 and thence downwardly and around the drum 31 of the windlass 19, to which the two ends of the cable are attached. The drum 31 is supported on a shaft 32 having a crank 33, and said shaft is journaled in an inverted U-shaped bracket 34 riveted or otherwise secured to a plate 35 attached to the bottom of the base plate 12 and providing supports for the pulleys 17 and 18.

Attached to or cast integrally with the drum 31 is a ratchet wheel 37 which is normally engaged by a dog 38, the function of which is to lock the drum against clockwise rotation, as viewed in Fig. 2. The dog is provided with a handle 39 by means of which it can be manually lifted out of engagement with the ratchet wheel.

Preparatory to an assembling operation the cable 16 is loosened by backing off on the drum 31 and the four corner blocks are positioned on the base plate in approximately correct location to receive the frame members 10a—10d. The latter are then laid on the corner blocks in approximate juxtaposition to the several lugs 21 and 22 and the square notches 25. Thereupon, the drum 31 is rotated in the counterclockwise direction, Fig. 2, to tighten the cable—thus drawing the four pieces 10a—10d into tight engagement at the four corners of the frame 10.

The four interior clamps 28 may then be positioned as shown and fastened by means of the wing nuts 27, thereby positively securing the frame members in truly square relation. The frame is then ready for nailing or screwing of the corners and it is here that the spacing of the lugs 22 relative to the housing 23, as indicated at 40, becomes very important, because this exposes enough of each corner of the work for much easier fastening. Furthermore, the work may, if desired, be turned, with the base plate 11 or relative to it, to assume an upright position, at right angles to base 11, so as to afford the workman still greater convenience in the matter of driving the screws or nails. In swinging the work upwardly relative to plate 11 the pivoting is on the axis a—a, indicated in Figs. 1 and 2, defined by the lower flight of cable 16.

It will be evident that my improved work holding device is well adapted to rapid and accurate assembling operations on square, rectangular, oval, and round frame work of all kinds, from the smallest to the largest, the rounded corners 40 on lugs 22 adapting the same to non-marring engagement with round and oval work. While the device can be used to good advantage particularly in stores and shops doing picture frame work, it will also be found useful to cabinet makers generally, and also home-crafters and hobbyists for a variety of purposes.

While I have shown only that embodiment of the invention which I presently regard as the preferred one, it will be apparent that various modifications may be made within the purview of the inventive concept. Hence, I do not wish to be limited otherwise than as clearly indicated by the terms of the appended claim.

I claim:

The combination in a woodwork clamping device, of a base plate, a plurality of joint spanning blocks slidable on said plate, each including a pulley in a plane parallel to and above the plate and upright locating lugs operative on opposite sides of the pulley to provide lateral support for contiguous angularly related abutting pieces of work, a windlass supported by the base plate, and a cable embracing the block pulleys, conjointly, and attached at the ends to the drum of the windlass, the windlass being located below the base plate and there being two raised guide pulleys on the base plate above the windlass in alignment with one another longitudinally of said base plate over which the two end portions of the cable going to the windlass from two pulleys on opposite sides of the guides are extended downwardly for connection with the windlass drum, these guides being independent of the windlass and having the tops thereof disposed on a line extending longitudinally of said base plate parallel to and above said plate and in tangential relationship to the last named two pulleys, whereby to permit swinging the clamped work and the whole group of blocks relative to the base plate about an axis parallel to the base plate defined by the cable ends that extend over said guides.

References Cited in the file of this patent

UNITED STATES PATENTS

| Number | Name | Date |
|---|---|---|
| 54,463 | Dunne | May 1, 1866 |
| 282,427 | Weaver | July 31, 1883 |

FOREIGN PATENTS

| Number | Country | Date |
|---|---|---|
| 4,118 | Great Britain | Dec. 15, 1873 |
| 3,451 | Great Britain | Feb. 15, 1896 |
| 339 | Great Britain | Jan. 5, 1906 |
| 61,035 | Switzerland | Sept. 21, 1912 |